3,183,935
LEVELLING VALVE FOR VEHICLES WITH PNEU-
MATIC OR HYDRAULIC SUSPENSION
Raymond John Davies and Peter Derek Mills, Warwick,
England, assignors to Dunlop Rubber Company Limited, County of London, England, a British company
Filed Mar. 29, 1962, Ser. No. 183,649
Claims priority, application Great Britain, Apr. 5, 1961,
12,102/61
14 Claims. (Cl. 137—627.5)

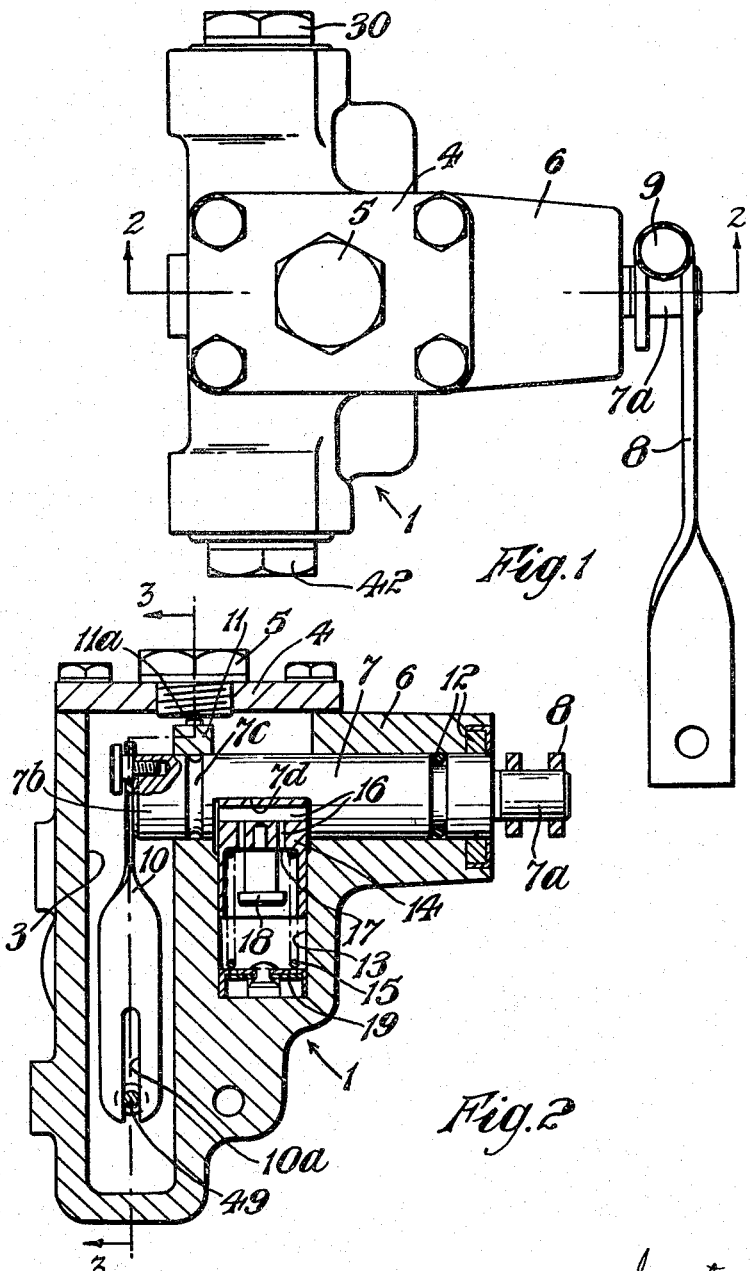

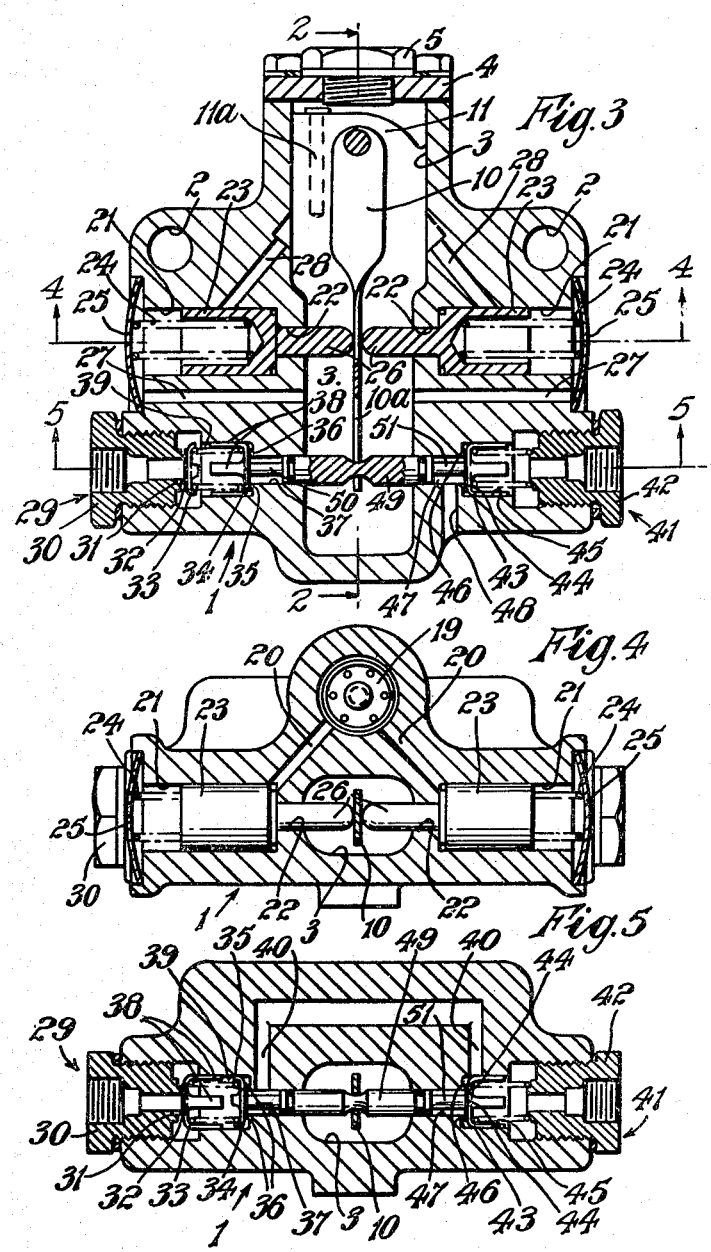

This invention relates to an improved levelling valve for vehicles with hydraulic or pneumatic suspension, and more particularly relates to improvements in or developments of the levelling valve described in our co-pending British Patent 924,731.

In said British patent there is described and claimed a levelling valve for a vehicle having a pneumatic or hydraulic suspension system which includes an operating shaft arranged to be rocked in response to a change in level of the sprung portion of the vehicle to actuate the fluid control mechanism of the valve, and a pumping member operable by repeated oscillations of the shaft occurring as the result of the undulations arising from the periodicity of the unsprung weight of the vehicle during running of the vehicle to pump fluid into an accumulator which, when it can accept no more fluid, locks the shaft against movement, the accumulator having a bleed such that sustained pressure on the pumping member will, after a certain time delay, permit the shaft to turn slowly to correct the level of the unsprung portion of the vehicle.

The object of the present invention is to provide an alternative form of levelling valve to the above.

According to the present invention a levelling valve comprises a housing, an operating shaft mounted therein, a pumping member for fluid operable by repeated oscillations of the shaft occurring as the result of the motion of a vehicle to which the levelling valve is secured, a rocking lever connected at one end to and movable by said shaft and adapted to pivot intermediate its ends on pivot means to control flow of fluid into and out of a fluid spring, said pivot means being removable by the pressure of fluid pumped by said pumping member to a position remote from said rocking lever so that the latter can no longer pivot to control the flow of said fluid.

Preferably the pumping member is adapted on oscillation of the shaft to supply pressure fluid to a pair of axially opposed cylinders one on each side of the lever and each containing a piston slidable therein. Each piston is spring loaded towards the rocking lever so that a projection from the front of each piston contacts the lever on each side providing a fulcrum about which the lever can pivot to control the flow of fluid. The pumping member is adapted to compress fluid in an accumulator chamber which is so connected to each of said cylinders as to permit the fluid pressure to overcome the spring force and to urge said piston away from the lever leaving the latter without a pivot about which to turn thus rendering the levelling valve inoperative. A bleed is provided to let pressure fluid leak away from the cylinders when the vehicle is stationary so that the spring loading will urge the pistons into a position whereby the lever may again pivot about the projections.

The preferred embodiment of the invention will now be described with reference to the accompanying drawings of which:

FIGURE 1 shows a plan view of the levelling valve;
FIGURE 2 shows a cross-sectional view in the direction of the arrows on the lines 2—2 in FIGURES 1 and 3;
FIGURE 3 shows a cross-sectional view in the direction of the arrows on the line 3—3 in FIGURE 2;
FIGURE 4 shows a cross-sectional view in the direction of the arrows on the line 4—4 in FIGURE 3;
FIGURE 5 shows a cross-sectional view in the direction of the arrows on the line 5—5 in FIGURE 3.

The levelling valve of our invention has a body 1 which is adapted to be secured to a vehicle chassis member by bolts passing through bolt-holes 2 (FIGURE 3). The body has a central vertically disposed chamber 3 opening at the top and sealed by a cover plate 4 having a removable plug 5. A hollow boss 6 projects from one side of the body 1 and this holds an operating shaft 7 (FIG. 2) rotatable over a limited arc therein. One end 7a of the shaft 7 projects from the boss 6 and is splined to receive an operating arm 8 to be secured thereto by a clamp bolt 9. The other end 7b of the shaft 7 projects into the central chamber 3 where the upper end of a rocking lever 10 is pivoted eccentrically to it. Near the top the central chamber 3 is divided by a partition 11 which also serves as a pedestal bearing for the shaft 7. Seals 12 are provided encircling the shaft to maintain fluid tightness of the chamber 3. A pin 11a enters a hole in the partition 11 in position to engage an annular groove 7c on the shaft 7 to prevent axial movement of the latter.

In between the partition 11 and the boss 6 (see FIGURE 2) the shaft 7 is cut away to form a flat downwardly presented cam surface 7d. Below the surface 7d a vertical cylinder is formed which constitutes an accumulator chamber 13 and a piston 14 spring loaded upwardly by a spring 15 into abutment with the cam surface 7d is slidable therein. The piston 14 is provided with a crown and a skirt, and the crown has passages 16 drilled axially and transversely to connect the space above the crown with the space below. A flap valve 17 held in position by a retaining pin 18 on the underside of the crown covers the openings of the axial passages 16. The bottom of the accumulator chamber 13 is provided with a non-return valve 19 and horizontal passages 20 extend away therefrom (see FIGURE 4).

At approximately the same level as the bottom of the accumulator chamber 13 a pair of co-axial cylinders 21 (FIGURE 3) are formed and apertures 22 connect the cylinders 21 with the central chamber 3. Pistons 23 are slidable in the cylinders 21 and are spring-urged towards the control chamber 3 by springs 24 bearing against fluid-tight covers 25 for the cylinders 21. Round nosed projections 26 from the forward ends of the pistons 23 pass fluid-tightly through the apertures 22 and abut the rocking lever 10 intermediate its ends to provide a fulcrum therefor. The ends of the cylinders 21 adjacent the apertures 22 are connected by the passages 20 to the bottom of the accumulator chamber 13 (see FIGURE 4). Vent passages 27 are provided to connect the near end of the cylinders 21 with the control chamber 3 and relief passages 28 connect the cylinders 21 with the control chamber 3 when the pistons 23 are in their rearmost positions.

Towards the bottom of the control chamber 3 the valve body 1 is formed to receive an inlet valve assembly 29 connected to a source of air pressure and an exhaust valve assembly connected to an air spring. The inlet valve assembly comprises a pipe adaptor 30 screwed into the body 1 the inner end thereof being formed as a raised annular ridge 31 fluid-tightly to abut a pad of rubber mounted on a carrier 33 and spring-urged against the ridge 31. A similar carrier 34 and pad 35 are spring-urged into abutment with a raised lip 36 of an aperture 37 which enters the control chamber 3. Both carriers 33 and 34 are formed with four axially-extending legs 38 which interleave and retain the rubber pads 32 and 35 square to their co-operating parts by being guided by the walls of an inlet valve chamber 39. A cross feed passage 40 (FIGURE 5) opens off the aperture 37.

The exhaust valve assembly 41 comprises a pipe adaptor 42, a carrier 43 for a rubber pad 44 movable in an exhaust valve chamber 45 and engageable with a raised lip 46 of an aperture 47 entering the chamber 3, all arranged in a similar manner to that of the inlet valve and there being no raised annular ridge on the adaptor 42 and no associated pad and carrier. The cross feed passage 40 (FIGURE 5) opens into the exhaust valve chamber 45 and an exhaust vent 48 connects the aperture 47 with atmosphere.

Both apertures 37 and 47 comprise cylinders co-axial with each other and having a double-ended piston member 49 fluid-tightly slidable in both. Fingers 50 and 51 project from the ends of the piston member and are adapted to lift one or other of the pads 34 or 44 respectively. The middle of the piston member 49 is waisted.

Rocking lever 10 is loosely and eccentrically pinned to the end of the shaft 7, so that with the shaft in a position corresponding to the design body height the rocking lever 10 is hanging vertically from a top dead centre position. The rocking lever 10 is formed with a 90° twist intermediate its ends and is adapted to fulcrum on the round nosed projections 26 below the twist. At its lower end the rocking lever has a slot 10a extending vertically upwardly and which is adapted to receive and closely straddle the waisted portion of the piston member 49. All cylinders and cavities in the valve body except the inlet and exhaust valve chambers 39 and 45, passage 40 and apertures 37 and 47 are filled with hydraulic fluid. The remainder contain air.

The operation of the levelling valve is as follows.

When the empty vehicle is stationary and is then loaded the chassis is displaced relative to the wheels and this is reflected in a rotary displacement of the shaft 7. When stationary the pistons 23 will be in their foremost positions due to the springs 24 and the round nosed projections 26 will abut the rocking lever 10. Rotary displacement of the shaft 7 due to loading causes the top of the rocking lever 10 to move towards the right as seen in FIGURE 3, consequently the lower end and the double piston member 49 move to the left so that the rubber pad 35 is unseated from the lip 36 by the finger 50 thus allowing air to flow from the source, past the pad 32, through the inlet valve chamber 39, aperture 37, cross feed passage 40 (FIGURE 5), exhaust valve chamber 45 into the fluid spring to raise the chassis and restore normal chassis height and the shaft 7 to its mean position where the rocking lever 10 is vertical.

When the vehicle is driven away the vertical motion of the chassis causes the shaft 7 to rock about its axis so that the cam surface 7d urges the piston 14 up and down. The down stroke of the piston 14 forces fluid below the piston past the valve 19 into the accumulator chamber and thence through the passages 20 into the ends of the cylinders 21 to force the pistons 23 and their projections 26 away from the lever 10. Upon the upstroke of the piston 14 under the force of the spring 15 fluid is drawn from the chamber 3 through the hollow boss 6 and the flap valve 17 into the space below the piston, the fluid in the cylinders 21 being held from return flow into the cylinder 13 by the flap valve 19. Upon repeated reciprocation of the piston 14 in this manner the pistons 23 and their projections 26 will be moved against the force of the springs 24 entirely clear of the lever 10 so that this lever cannot be fulcrumed on these projections and cannot actuate the member 49 and the valves in the valve chamber 39. During the movement of the pistons 23 away from the lever 10 fluid from the ends of the cylinders 21 distant from the lever 10 pass through the passages 27 into the chamber 3. When the pistons 23 have reached their farthest position from the lever 10 the return passage 28 is uncovered and the fluid merely circulates from the accumulator chamber 13 through the passages 20 to the cylinder 21 and through the passages 28 to the chamber 3. Thus the air spring is isolated from the air source while the vehicle is in motion.

When the vehicle stops the fluid pumping action ceases and the pistons 23 are pushed by the springs 24 along the cylinders 21 the fluid in the front end of the pistons passing to the passage 20 through bleed openings, until the round nosed projections 26 abut the rocking lever 10. This movement of the pistons 23 is permitted because it is arranged that fluid can leak past the piston 23 into the relief passage 28. Subsequent unloading of the vehicle will cause the body height to change with the result that the shaft 7 will be rotated so that the top of the rocking lever 10 is moved to the left as seen in FIGURE 3. This movement causes the bottom of the lever 10 and the double ended piston 49 to move towards the right. In consequence the finger 51 unseats the pad 44 and allows air to flow out of the spring through the chamber 46, aperture 47 and vent 48 to atmosphere, thus lowering the chassis to its normal height and rotating the shaft 7 to centre the rocking lever 10.

The levelling device of the present invention permits the valve mechanism to admit pressurized fluid to the pneumatic suspension or exhaust it therefrom to level the vehicle body when the vehicle is stationary and the pivoting elements are in position to provide a fulcrum for the lever 10. But when the vehicle is in motion the temporary displacement of the running gear relative to the vehicle body, caused by the irregularities in the roadway, immediately withdraws the fulcrum elements from the lever and renders the lever inoperative and prevents successive operations of the valve mechanism and successive admissions of the pressurized fluid to the pneumatic suspension which would be adverse to the functions of the pneumatic suspension.

Having now described our invention, what we claim is:

1. A levelling valve for pneumatic suspension for vehicles which comprises a housing, an operating rock shaft journaled in said housing to be rocked by displacements of a running gear relative to a vehicle body, valve means in said housing to control the flow of fluid to and from a pneumatic suspension of a vehicle, a fulcrum resiliently pressed to operative position, a lever fulcrumed on said fulcrum when said fulcrum is in operative position and connected to said valve means and to said rock shaft to be tilted by said rock shaft about said fulcrum to operate said valve means and a fluid actuated means actuated by successive rocking of said rock shaft to move said fulcrum to inoperative position to render said lever inoperative and to permit said fulcrum to return to operative position when rocking of said rock shaft ceases.

2. A levelling valve according to claim 1 wherein said fulcrum comprises a pair of aligned projections having rounded noses movable towards and away from abutment with opposite sides of said lever.

3. A levelling valve according to claim 2 wherein said fluid actuated means comprises axially aligned pistons on which said projections are mounted.

4. A levelling valve according to claim 3 in which said housing has a passage from said fluid actuated means to one end of each of said pistons to bias the pistons away from said lever.

5. A levelling valve according to claim 3 wherein said housing has a central chamber and an accumulator chamber and said rock shaft comprises a cam surface and in which said fluid actuated means comprises a plunger slidable in said accumulator chamber and spring loaded into abutment with a cam surface on said rock shaft and a non-return valve in said plunger to pass fluid into said accumulator chamber from said central chamber.

6. A levelling valve according to claim 5 in which said housing comprises passages from said accumulator chamber to each of said pistons and a non-return valve to pass fluid through said passages from said accumulator to said pistons.

7. A levelling valve according to claim 6 in which said housing comprises cylinders in which said pistons slide and having a leak path around the pistons to the central chamber.

8. A levelling valve according to claim 7 wherein said lever is connected at one end to said rock shaft and at the other end to said fluid actuated means and wherein said projections abut said lever at a point intermediate the ends thereof.

9. A levelling valve according to claim 8 wherein the cam surface on the shaft comprises a flat chordal surface abutting the end of said plunger.

10. A levelling valve according to claim 9 comprising an arm secured to one end of said rock shaft.

11. A leveling valve according to claim 10 wherein said lever is pivoted at one end eccentric to said rock shaft and said housing comprises an inlet for pressurized fluid, an outlet to supply a pneumatic spring and an exhaust outlet, said fluid actuated means comprising a valve element connected to the other end of said lever to control the admission of fluid through said inlet and to said outlet and exhaust.

12. A levelling device for levelling a vehicle body relative to a running gear which comprises a housing having an inlet for pressure fluid, a supply outlet to supply pressure fluid to a pneumatic suspension of a vehicle and an exhaust opening, an actuating lever, a fulcrum for said lever comprising a pair of fulcrum elements resiliently pressed to opposite sides of said lever to provide a pivotal axis between the opposed ends of said fulcrum elements, a rock shaft mounted in said housing to be rocked in opposite directions as a running gear approaches or recedes from a vehicle body and engaging said lever eccentrically of the axis of said rock shaft to tilt said lever on said culcrum axis, a valve mechanism actuated by said lever to connect said outlet alternatively to said inlet or to said exhaust, a pair of pistons one for each fulcrum element to withdraw said fulcrum elements from said lever and render said lever inoperative, and a pump driven by successive reciprocating rockings of said rock shaft to supply fluid under pressure to said pistons to withdraw said fulcrum elements from said lever, said housing having a bleed passage to permit return of said fulcrum elements upon cessation of said rocking of said rock shaft.

13. The levelling device of claim 12 in which said rock shaft has a chordal surface and said pump comprises a piston spring pressed to said chordal surface to be displaced by said chordal surface upon rocking of said rock shaft.

14. A levelling device according to claim 13 in which said housing has a passage from said inlet to said outlet and exhaust and said valve mechanism comprises a double-ended piston member engaged and moved by said double-ended piston member to open or close said inlet of said passage, and a valve movable to open said passage to said outlet and alternatively to open said outlet to said exhaust.

References Cited by the Examiner
UNITED STATES PATENTS
2,947,530   8/60   Davis.
FOREIGN PATENTS
569,787   11/57   Italy.

WILLIAM F. O'DEA, *Primary Examiner.*
LEO FRIAGLIA, *Examiner.*